G. T. YOUNG & A. H. GLEASON.
CALIPERS.
APPLICATION FILED JUNE 16, 1908.

942,529.

Patented Dec. 7, 1909.

WITNESSES
M. E. Flaherty
W. P. O'Brien

INVENTORS
George T. Young
Albert H. Gleason
by their attys
Charles Raymond & Coale

UNITED STATES PATENT OFFICE.

GEORGE T. YOUNG, OF STONEHAM, AND ALBERT H. GLEASON, OF STOW, MASSACHUSETTS.

CALIPERS.

942,529.

Specification of Letters Patent. Patented Dec. 7, 1909.

Application filed June 16, 1908. Serial No. 438,742.

*To all whom it may concern:*

Be it known that we, GEORGE T. YOUNG, of Stoneham, in the county of Middlesex and State of Massachusetts, and ALBERT H. GLEASON, of Stow, in said county and State, have invented a new and useful Improvement in Calipers, of which the following is a full, clear, and exact description, reference being had to the accompanying drawings, forming a part of this specification, in explaining its nature.

The essential object of our invention is to provide a caliper that can be conveniently operated when held in the hand; in fact, our object in this particular being to provide a caliper that can be operated in the manner and with the facility of scissors.

It is the further object of our invention to provide an outside or inside measuring caliper that can be manufactured at comparatively little cost.

Our invention can best be seen and understood by reference to the drawings, in which—

Figure 1:
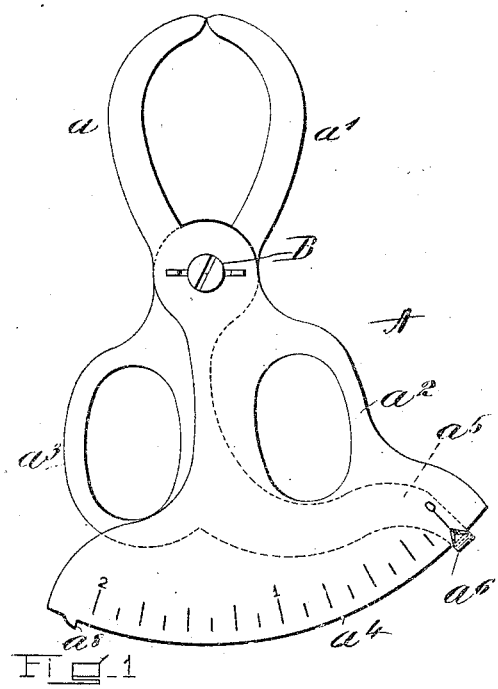
Figure 2:
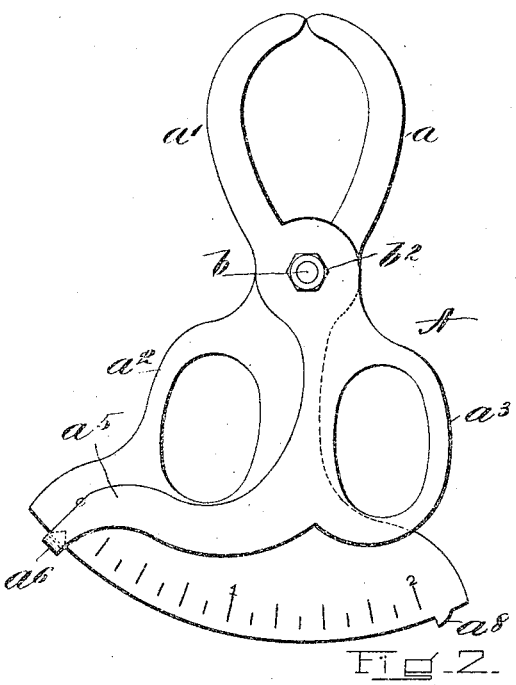
Figure 3:
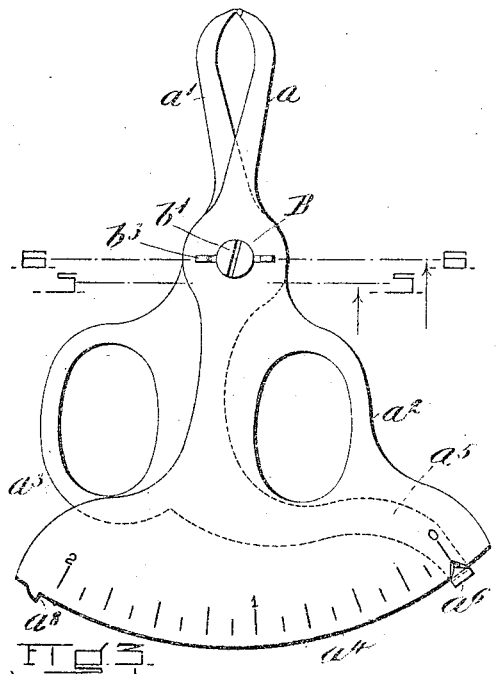
Figures 4, 5, 6:
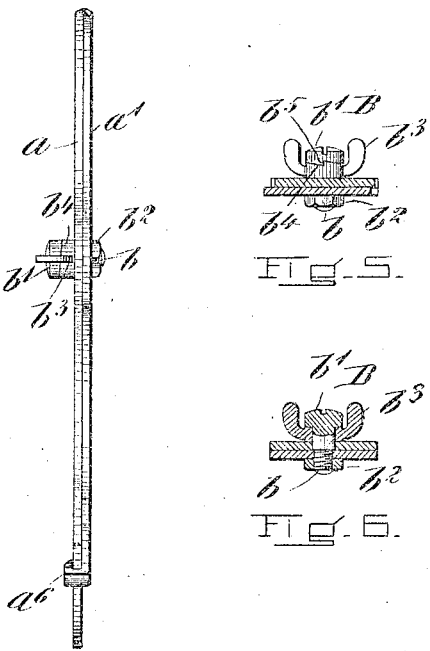

Figure 1 shows the improved caliper in plan, the particular form of caliper shown in this figure being for outside measurement. Fig. 2 shows in plan the reverse side of the caliper shown in Fig. 1. Fig. 3 shows in plan an inside measuring caliper embodying the invention. Fig. 4 is a side elevation of the caliper shown in Fig. 3, this figure showing especially the means for forming the pivotal connection between the two members of the caliper. Fig. 5 is a section on the line 5—5 of Fig. 3, and Fig. 6 is a section on the line 6—6 of Fig. 3.

Referring to the drawings:—A represents the improved caliper. This comprises the measuring legs $a$, $a^1$ pivotally connected with one another by the connection B. For operating the measuring legs we have provided the handles $a^2$, $a^3$, respectively, having formed therein openings providing thumb and finger holds by which the handles may be operated for operating the measuring legs of the device in the manner of scissors. Connecting with the handle $a^2$ is a graduated arc $a^4$ preferably graduated on both sides thereof. Connecting with the other handle $a^3$ is an arm $a^5$. This arm extends alongside the graduated arc $a^4$ and preferably by the opening forming the thumb or finger hold in the handle $a^2$ without interfering with this opening. The arm is also preferably so far extended that the end thereof will turn around the edge of the graduated arc and form an index finger $a^6$ coördinating with the scale on the face of the graduated arc. The turned end of the arm also acts to assist in holding the arm and the arc in proper coördination with one another in the operation of the device.

If desired, a scale may be formed on the rear side of the measuring arc as shown in Fig. 2 so that a measurement may be taken either upon the face or from the rear side of the measuring arc, depending upon the manner in which the device is held to be operated. The customary manner of holding the device for operating it would be to hold it in the hand with the thumb passing through the opening in the handle $a^2$ and one of the fingers of the operator passing through the opening in the handle $a^3$. When so held the graduated face of the arc would be presented to the operator as shown in Fig. 1. If, however, the device were taken up and the thumb passed through the opening in the handle $a^3$ and one of the fingers through the opening formed in the handle $a^2$ the device could still be used, but the rear face of the measuring arc would be presented to the operator as shown in Fig. 2. Accordingly by providing scales on both sides of the measuring arc a measurement can be taken irrespective of how the device is held.

In order to prevent the arm $a^5$ from slipping off the end of the measuring arc when the handles are opened a maximum amount, there may be formed on the end of the arc a stop $a^8$ against which the turned end of the arm will contact, so preventing the arm from leaving the arc.

In Fig. 3 the embodiment of the invention is the same as shown in Fig. 1, excepting, however, that the legs of the device are so arranged that an inside measurement may be taken instead of an outside measurement as shown in Fig. 1.

The handles $a^2$, $a^3$ provided as they are with thumb and finger holds and operating as they do, furnish a very convenient means for holding the caliper in the hand for bringing the measuring legs in proper conjunction with the object to be measured. With the caliper thus held and operating, the measurement cannot only be conveniently taken as the caliper is held in one hand of the operator, but the holding is just right for the measurement to be conveniently read.

Inasmuch as the operator need employ only one hand for taking a measurement the other hand can be used in operating some device for maintaining the caliper in a position commensurate with or indicative of the degree of measurement. We prefer that this be done by tightening the pivotal connection B and accordingly have made this connection as follows:—

$b$ represents a pin passing through the two parts of the caliper at the base of the legs thereof or where they connect with the handles. This pin provides the pivotal bearing on which the legs and handles turn. On one end of this pin and preferably on the front side of the caliper the pin is provided with a head $b^1$ and on its other end on the other side of the caliper it has a stationary nut $b^2$ that bears against the side of the caliper. Between the head of the pin and the side of the caliper to which it is adjacent is inserted a winged nut $b^3$ through which the pin passes, the nut fitting loosely around the pin so that it may be turned with respect thereto. The head of the pin bears against this nut with an inclined surface or surfaces $b^4$ and edge $b^5$. The upper end of the nut which receives the bearing of the head is provided also with the same inclined surfaces and edge. The effect is that in its normal position the connection thus made will pivotally hold the two parts of the caliper in position to work easily and properly. Upon turning the winged nut $b$ the inclined surface thereof will bear against the inclined surface of the head whereupon the operating parts of the caliper will be pressed together and maintain a positive position until they are released upon turning back the nut.

A caliper embodying our invention can be made at very little cost. In fact, apart from the pivotal connection, the caliper comprises only two separate parts or members and these parts can be stamped or died out from sheet metal plate, on which account the caliper can not only be economically formed, but the parts thereof can be made with absolute precision so that the caliper will be very accurate in its measurement.

Having thus fully described our invention, we claim and desire to secure by Letters Patent of the United States:—

1. A caliper having in pivotal combination measuring legs, handles for operating said legs, said handles having thumb and finger holds, a graduated member carried by one of said handles on the end thereof and extending in part beneath the hold of the other handle when the handles are in a closed position, and an arm carried by said other handle to extend alongside said graduated member and beneath the hold of said handle to which the graduated member is secured.

2. A caliper having in pivotal combination measuring legs, handles for operating said legs, said handles having thumb and finger holds, a graduated arc carried by one of said handles on the end thereof and an arm carried by the other of said handles, said arm extending over said graduated arc with the end of said arm turned around the end of said arc forming a pointer coöperating with the graduations on said arc.

GEORGE T. YOUNG.
ALBERT H. GLEASON.

Witnesses:
JOHN E. R. HAYES,
M. E. FLAHERTY.